United States Patent [19]

Makinen et al.

[11] Patent Number: 5,758,067

[45] Date of Patent: May 26, 1998

[54] AUTOMATED TAPE BACKUP SYSTEM AND METHOD

[75] Inventors: Bruce A. Makinen, Fort Collins; Ellen M. Nelson, LaPorte; Robin L. Steele, Fort Collins; Ida L. Newcomer, Fort Collins; David A. Erickson, Fort Collins, all of Colo.

[73] Assignee: Hewlett-Packard Co., Palo Alto, Calif.

[21] Appl. No.: 931,230

[22] Filed: Sep. 16, 1997

Related U.S. Application Data

[63] Continuation of Ser. No. 426,772, Apr. 21, 1995, abandoned.

[51] Int. Cl.[6] ............................................. G06F 4/00
[52] U.S. Cl. ............................. 395/185.07; 711/162
[58] Field of Search ..................... 395/182.03, 182.04, 395/182.05, 182.06, 182.07, 185.01, 185.07, 185.1, 183.22, 182.13, 182.14, 182.17, 182.18; 711/162, 161

[56] References Cited

U.S. PATENT DOCUMENTS

| | | | |
|---|---|---|---|
| 4,814,971 | 3/1989 | Thatte | 395/182.13 |
| 5,133,065 | 7/1992 | Cheffetz et al. | 364/200 |
| 5,210,866 | 5/1993 | Milligan et al. | 395/182.04 |
| 5,263,154 | 11/1993 | Eastridge et al. | 395/182.04 |
| 5,276,867 | 1/1994 | Kenley et al. | 395/600 |
| 5,386,545 | 1/1995 | Gombos, Jr. et al. | 395/700 |
| 5,495,570 | 2/1996 | Heugel et al. | 395/182.09 |

*Primary Examiner*—Robert W. Beausoliel, Jr.
*Assistant Examiner*—Joseph E. Palys
*Attorney, Agent, or Firm*—Patrick J. Murphy

[57] ABSTRACT

A system and method for automatically archiving data from a computer system to a backup system. The system provides a scheduler, connected to an automated backup mechanism, for scheduling when full backups are performed and when incremental backups are performed. A simple user interface is provided to ensure that once the end user has enabled the system, daily automatic backups will be performed without further input from the end user.

3 Claims, 6 Drawing Sheets

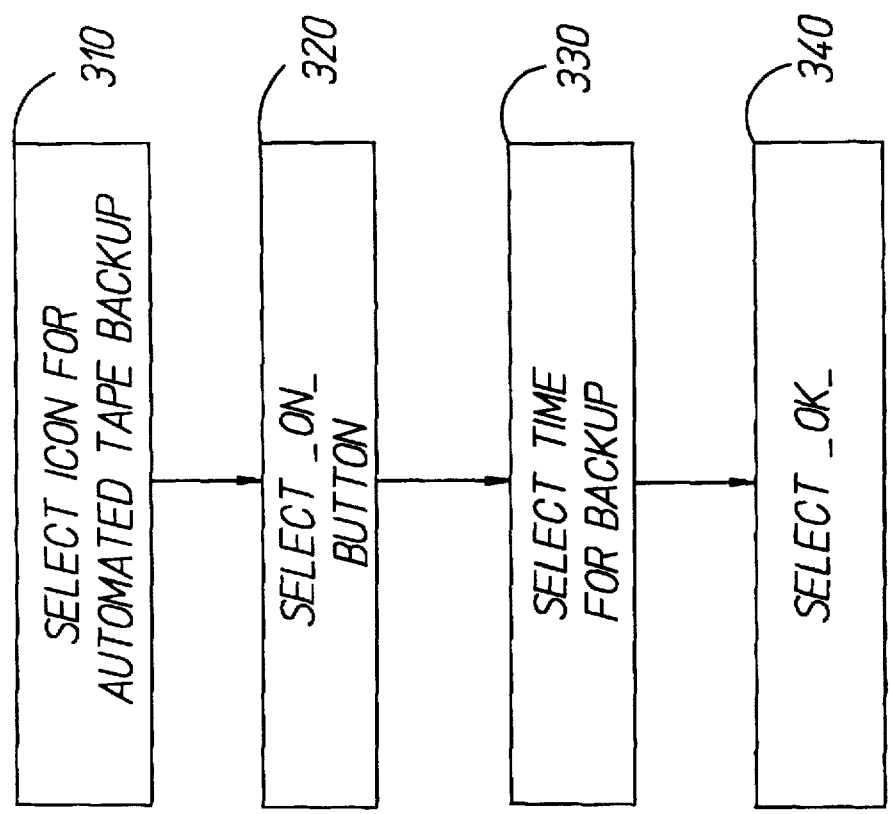

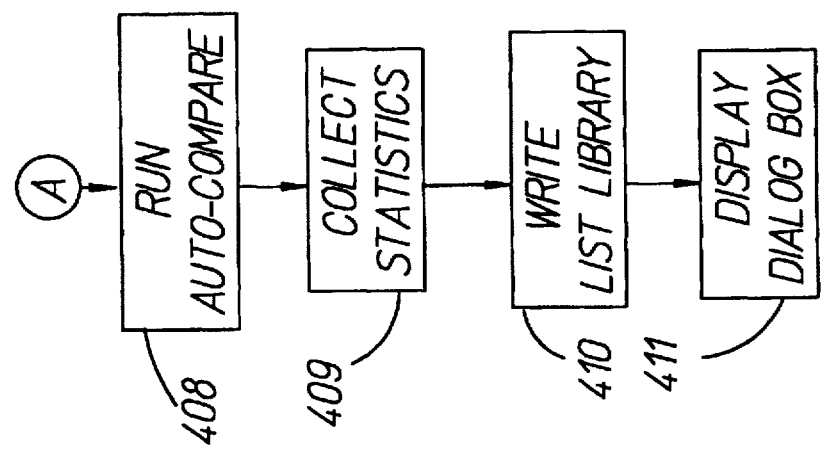

AUTOMATED TAPE BACKUP SYSTEM AND METHOD

CROSS REFERENCE TO RELATED APPLICATION

This is a continuation of application Ser. No. 08/426,772 filed on Apr. 21, 1995, now abandoned.

FIELD OF THE INVENTION

The present invention relates generally to computer systems and more particularly to an automated tape backup system and method.

BACKGROUND OF THE INVENTION

Tape backup systems are provided to protect data files and other information from computer system failures such as hard disk crashes or computer virus attacks. A tape backup system stores this data on off-line media (i.e., the tape); this data can then be retrieved in the event of data loss. Conventional backup systems typically provide the end user with a choice of making a "full" backup or an "intermediate" or "modified" backup. Full backups make complete copies of all the data on the computer to a set of one or more backup tapes. Incremental backups are generally much smaller than full backups since they simply save the data that has been changed since either the last full backup or the most recent incremental backup. An example of a conventional backup system is described in U.S. Pat. No. 5,276,860 entitled "Digital data processor with improved backup storage."

Problems with the conventional tape backup systems include the amount of system knowledge required of the end user and the rudimentary user interfaces provided in order to perform backups. Typically, the end user is tasked with a multitude of steps in order to perform the backup. If any one of these steps is either missed or taken incorrectly, data retrieval will be hindered if not rendered impossible. Examples of the needed steps include: (1) deciding whether the backup should be full or incremental; (2) deciding whether the data should be compressed or not; (3) selecting the correct tape for the type of backup being performed; and (4) selecting the time to perform the backup. Additional, end users are sometimes required to create elaborate backup macros with little or no assistance from the user interface.

SUMMARY OF THE INVENTION

The present invention provides an automated tape backup system and method. The automated tape backup system facilitates the archiving of files from a computer hard disk to a tape for restoration at a later time. A scheduler controls an automated backup mechanism. The scheduler uses system status information available from the computer system to determine, among other things, what type of backup is being performed. Very little system knowledge is required of the end user to initiate the present tape backup strategy. Once the system has been enabled by the end user, no other action is required to ensure daily backups of all files on the system's hard disk. A one-button paradigm has been selected to schedule the automatic backups, with full backups being performed on a predetermined day of the week, preferably Monday, and incremental backups being performed on every other day.

BRIEF DESCRIPTION OF THE DRAWINGS

FIG. 3 shows a flow diagram of the end user interaction with the present invention.

FIGS. 4a and 4b show a flow chart of the automatic tape backup method according to the present invention.

DETAILED DESCRIPTION OF THE PREFERRED EMBODIMENT

Briefly, the present invention provides a novel automated tape backup system and method. The automated tape backup system facilitates the archiving of files from a computer hard disk to a tape for restoration at a later time. Very little system knowledge is required of the end user to initiate the present tape backup strategy. A one-button paradigm has been selected to schedule the automatic backups, with full backups being performed on a predetermined day of the week, and incremental backups being performed on every other day.

Figure 1:
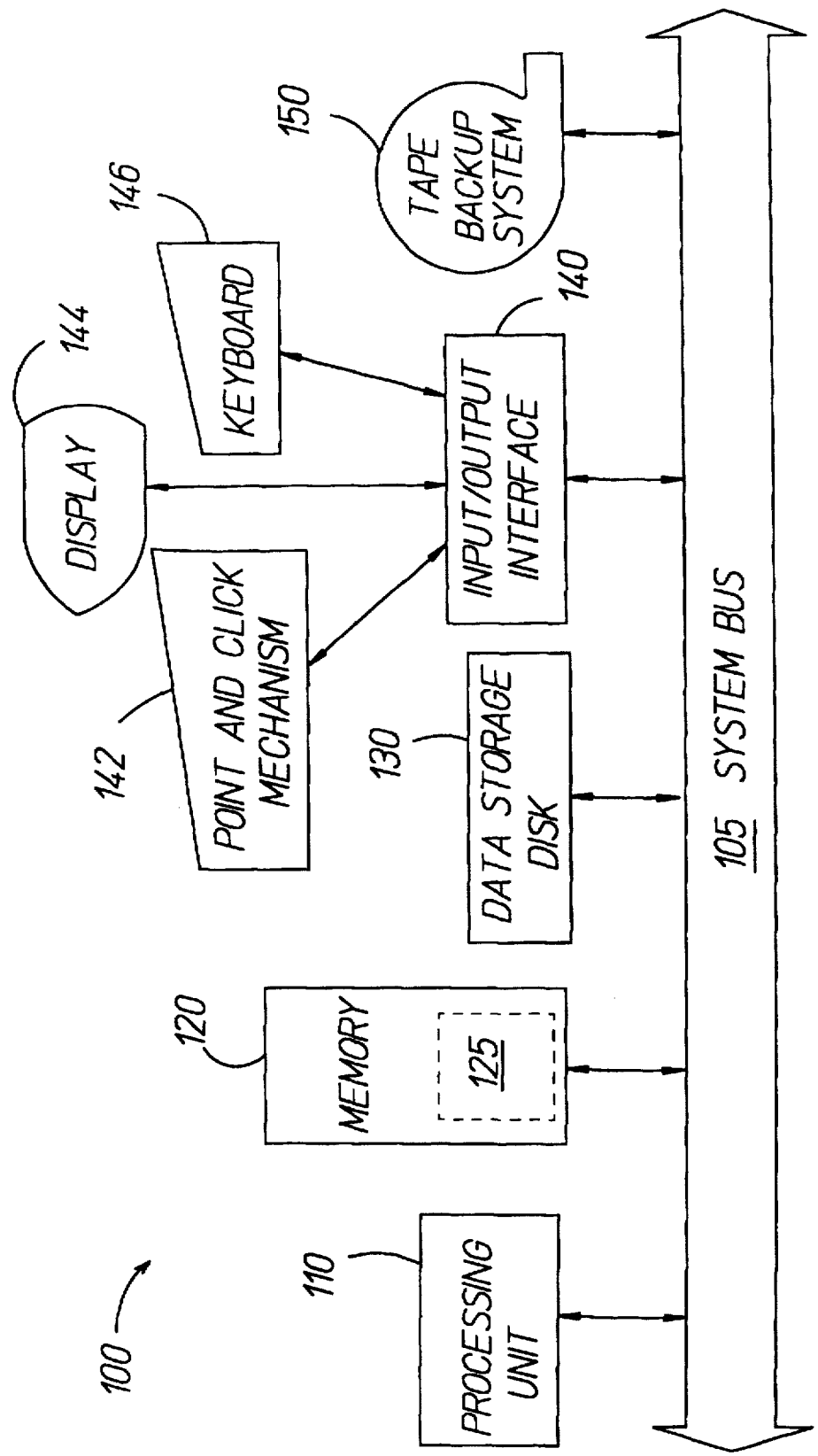
FIG. 1 shows a block diagram of a general purpose digital computer system incorporating the present invention.

FIG. 1 shows a block diagram of a general purpose digital computer system 100 incorporating the present invention. A processing unit 110 is connected to system bus 105. The system bus 105 facilitates communications between the processing unit 110 and memory 120, a data storage disk 130, an input/output interface device 140 and a tape backup system 150. In a preferred embodiment, the memory 120 stores the software of the present invention as well as all data collected and generated by the present invention. In another preferred embodiment, the software may be stored in the data storage disk 130.

An area 125 within the memory 120 is set aside for storage of the present method which is described more fully below. The input/output interface device 140 controls data communications between the bus 105 and a point-and-click mechanism 142 (e.g., a mouse, or a light pen), a display mechanism 144, and a keyboard 146. In a preferred embodiment, the tape backup system 150 can be any number of tape drives available from Hewlett-Packard Company, Palo Alto, Calif., USA, including the Jumbo 1400, Trakker 700 and Colorado T1000 tape drives.

Figure 2:
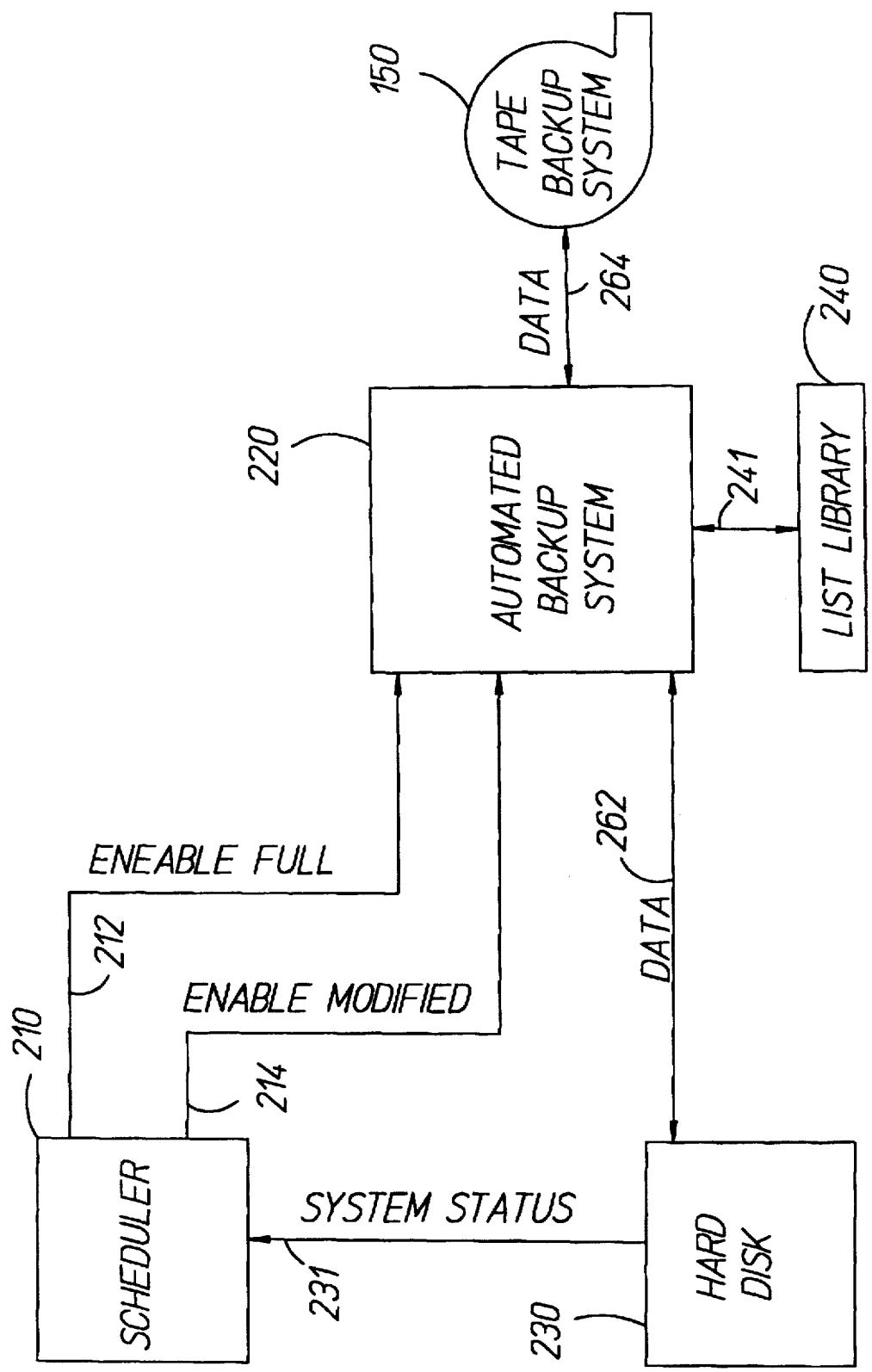
FIG. 2 shows a block diagram of a system for automatically backing up computer files to a tape.

FIG. 2 shows a block diagram of the present system for automatically archiving data from a computer system to a tape backup system. A scheduler 210 controls an automated backup mechanism 220 via control links 212 and 214. The scheduler uses system status information available from a hard disk 230 via link 231 to determine, among other things, what control signal to send to the backup mechanism 220. For example, if the scheduler 210 determines, based upon the system status 231, that a full backup is required, an ENABLE_FULL signal is sent to the backup mechanism 220 via link 212. The ENABLE_FULL signal causes the backup subsystem to make a complete archival copy of the hard disk 230 to the tape backup system 150. An ENABLE_MODIFIED signal is sent via link 214 when an incremental backup is required.

Information contained in a list library 240 is used to determine which files to access when the end user requests that the data archived to the tape backup system 150 be restored to the hard disk 230. The scheduler 210 and automated backup mechanism 220 can both be implemented with any suitable logic, for example, as a state machine in a conventional field programmable gate array (FPGA) with the functionality described above. Additionally, both can be implemented in an application-specific integrated circuit (ASIC), using conventional ASIC fabrication techniques.

FIG. 3 shows a flow diagram of the end user interaction with the present invention. At block 310, the end user selects the icon for the automated tape backup from a specified program manager backup group. After the dialog box is displayed (see FIG. 5), the end user selects the ON button (block 320) to enable the automated daily backup feature. The backup can occur at any time during the day; this is determined at block 330 wherein the end user selects the predetermined time to perform the backup. Finally, at block 340, the end user selects the OK button to initiate the present method. With these four steps, the reader will appreciate the ease at which the present system and method are set into motion. The present invention facilitates a comprehensive, automatic tape backup scheme for the less sophisticated end user. These four simple steps replace what would otherwise be a time-intensive task of creating macros to accomplish reliable data archiving.

Figure 4A:
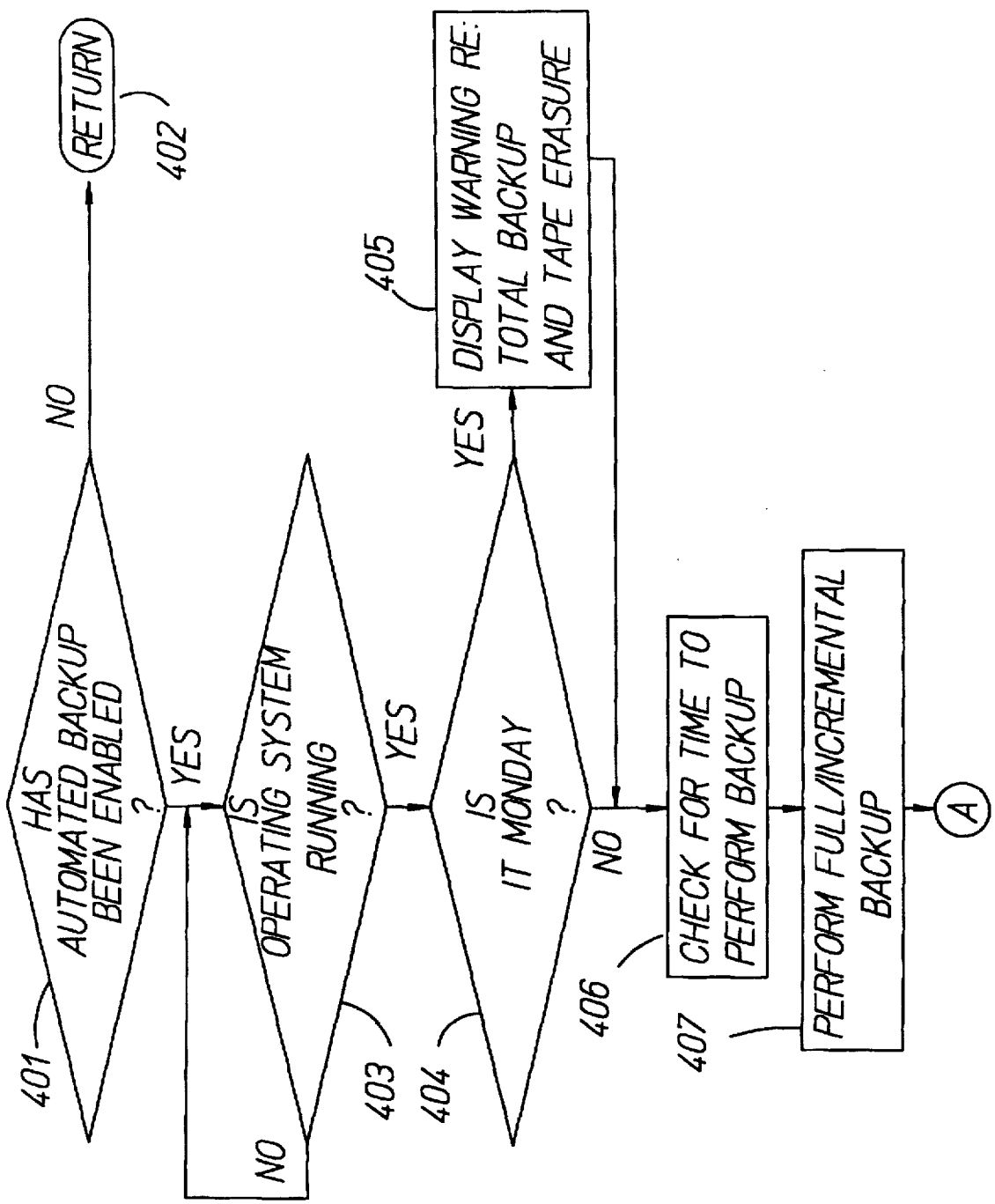

FIGS. 4a and b show a flow diagram of the automated tape backup system according to the present invention. Basically, the present system is in a wait state until the end user takes the steps illustrated in FIG. 3. Once the end user has initiated the backup, the present system and method will automatically perform regular backups indefinitely, until the end user selects to turn the automated backup system off. Referring to FIG. 4a, decisional block 401 determines whether the automated backup system has been initiated. If the automatic backup has not been initiated, control is returned 402 to its wait state.

After the automated backup has been initiated by the end user, control is passed to decisional block 403 which determines whether the operating system is presently running. If it is not running, the present method loops until the operating system is activated. In a preferred embodiment, the operating system is Microsoft Windows, available from Microsoft Corporation, Redmond, Wash., USA.

Control is passed to decisional block 404 if the operating system is running. Decisional block 404 determines whether it is currently Monday. The present invention is set up to perform full backups on Mondays and incremental backups the other six days of the week. Of course, the present invention contemplates performing full backups on other days of the week. If Friday was selected, for example, modification to decisional block 404 would be the only change necessary. If it is Monday, control passes to block 405 which displays a dialog box warning to the end user indicating: (1) a full backup will be performed; and (2) the tape in the drive will be erased. This dialog box is "system modal," requiring acknowledgment from the end user before anything else can happen. After (or during) display of the dialog box at block 405, the system will turn the TAPE OVERWRITE flag ON (not shown). If it is not Monday, control simply passes through to block 406 which waits for the predetermined time to perform the backup (see block 330 in FIG. 3). Block 407 then performs the automatic backup, either a full or incremental, based upon the day of the week.

A check is performed (not shown) before each back to determine if the required defaults macros are present. These default macros, one for performing a full backup and another for performing an incremental backup, are typically created when the end user installs the current system. If the default macros are not present, an error message is displayed indicating that the defaults are missing. The present method then can either provide information instructing the end user how to create the defaults or automatically step the end user through the creation of the default macros.

Referring now to FIG. 4b, block 408 runs an auto-compare on the files backed up before passing control to block 409 which collects statistics on the backup. The auto-compare ensures that the backup was successful. Essentially, the tape is rewound after the backup and each file that was archived is compared with the related file on the hard disk. Any errors detected during the auto-compare are notes and saved in an error file. These files are then left "untagged" so that an attempt to back them up the subsequent day is made.

Block 410 writes the files backed up to a list library. This list library can be used, for example, during a restore from tape back to hard disk. Block 411 displays a dialog box to the end user. The dialog box uses the statistics collected in block 410 to indicate which files have not been backed up. This dialog box must be acknowledged before control is returned to the operating system.

The end user also has the capability to cancel any tape backups during the backup process. While 407 is performing a backup, a minimized work area (i.e., icon) is displayed on the screen. The end user may select this icon to enlarge the work area. The work area displays the current status of the backup (i.e., what file is currently being backed up, what percentage of the hard disk has already been backed up, etc.). Additionally, the work are has an action key that will cancel the backup. Once the backup is canceled, any files not yet archived will be left untagged.

Figure 5:
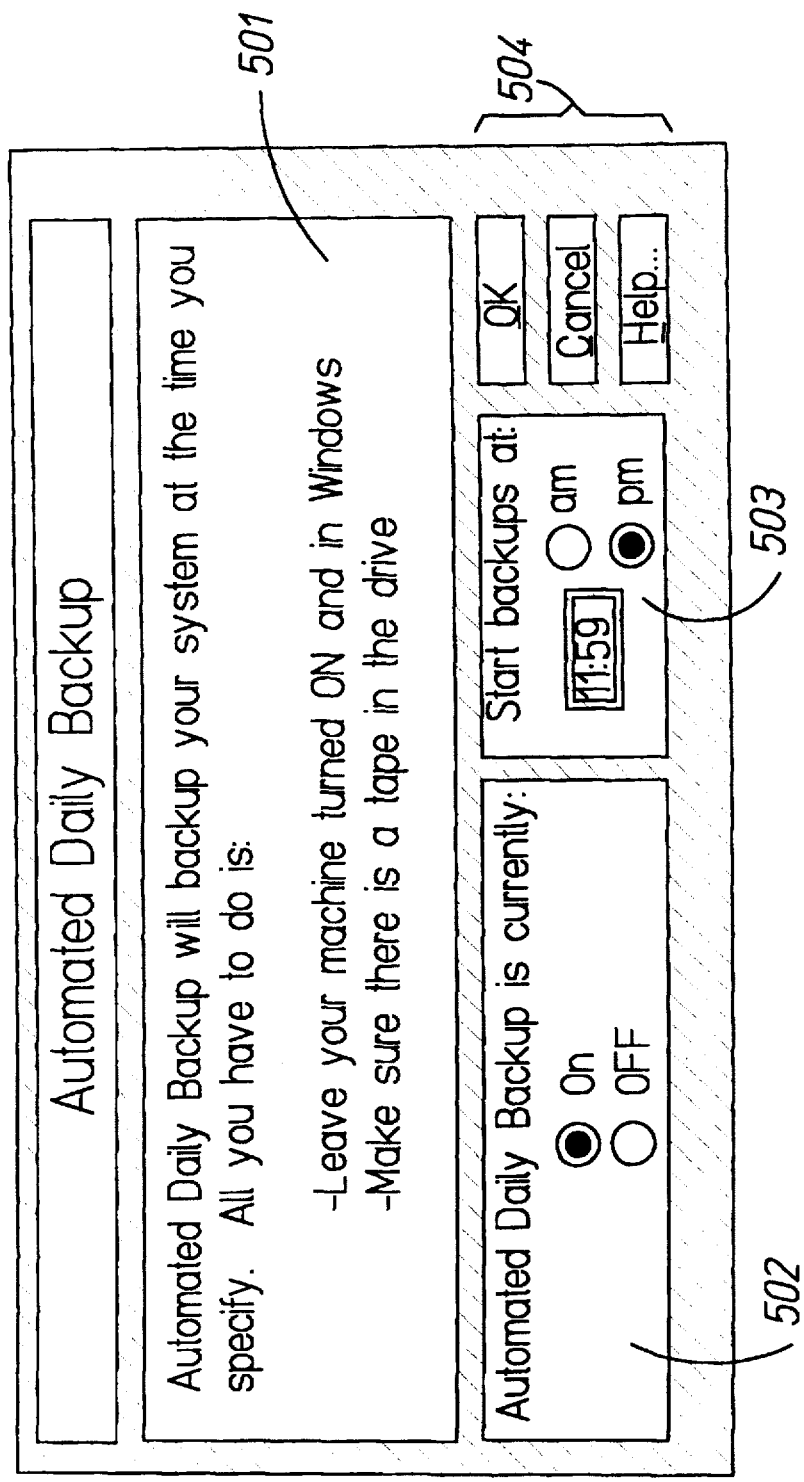
FIG. 5 shows an example of a user interface screen for the automated tape backup system

FIG. 5 shows an example of a user interface screen for the automatic tape backup system. A message area 501 indicates what the automatic tape backup system will be doing once the system is enabled. Reminders are provided to ensure that the backup is successfully performed. An enabling selection area 502 is provided to turn the automatic tape backup system ON or OFF. A time selection area 503 lets the end user customize the system as to what time of day the backups are to be performed. Finally, action keys 504 are provided to set the automatic backup system in motion, cancel the window, or display additional help and information about the automated tape backup system. Other simple user interfaces can be used in place of the one shown in FIG. 5 without departing from the scope of the present invention.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

What is claimed is:

1. A method for automatically archiving data files from a hard disk of a computer system to a backup system, the computer system having an operating system, the backup system having a backup medium, the method comprising the steps of:

(1) waiting for an end-user input signal indicative of initiating a data backup;

(2) upon receiving a user-input signal indicative of initiating a data backup, determining whether the operating system is presently running;

(3) if the operating system is not running, waiting until the operating system is activated;

(4) after the operating system is activated, determining what day of the week it is;

(5) if the day of the week is a preselected day of the week for full backups, displaying a dialog box to the end-user with information indicative of a full backup is to be performed and an erasure of data on the backup medium will occur;

(6) performing the full backup at a preselected time of day;

(7) if the day of the week is not the preselected day of the week, waiting for the preselected time of day to perform an incremental backup;

(8) after the backup is performed, rewinding the backup medium;

(9) comparing each data file archived on the backup medium with each related file on the hard disk; and

(10) if any errors are detected during step (9), writing an error message to a file.

2. The method of claim 1, further comprising the step of:

(11) continually automatically archiving data files from the hard disk to the backup medium until an end-user input signal indicative of ending the automatic archiving is received by the computer system.

3. The method of claim 2, wherein the backup system is a tape drive and the backup medium is a tape mini-cartridge.

* * * * *